United States Patent Office 3,209,676
Patented Oct. 5, 1965

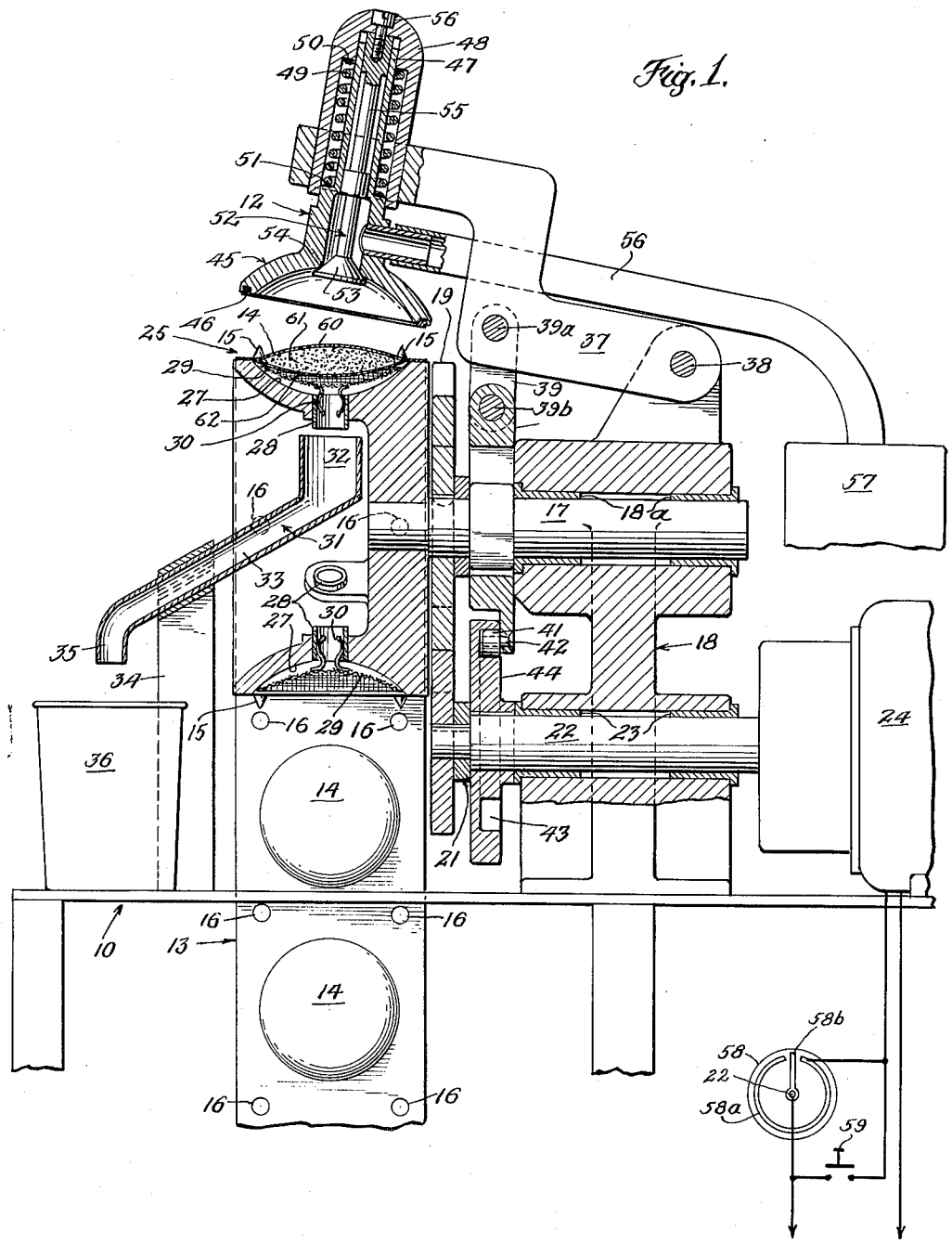

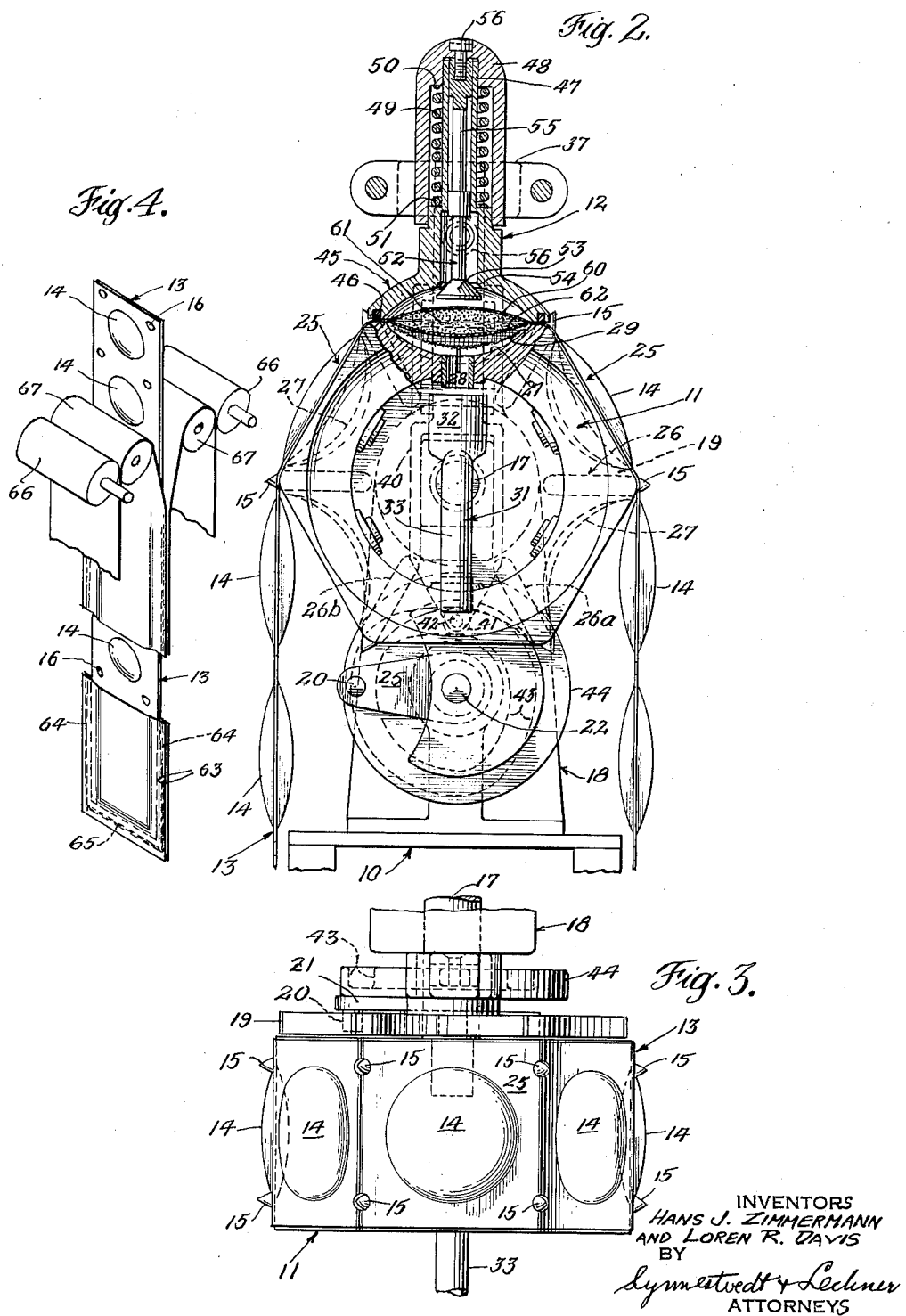

3,209,676
COFFEE DISPENSING
Hans J. Zimmermann, Philadelphia, and Loren R. Davis, Newtown, Pa., assignors to Rudd-Melikian, Inc., Hatboro, Pa., a corporation of Pennsylvania
Continuation of application Ser. No. 771,132, Oct. 31, 1958. This application Jan. 9, 1962, Ser. No. 174,640
10 Claims. (Cl. 99—289)

The application is a continuation of our prior application U.S. Ser. No. 771,132, now abandoned.

This invention relates to beverage dispensers and is particularly concerned with the type of beverage dispenser in which a quantity of beverage is brewed from a unit charge of beverage material and a predetermined amount of an extracting fluid.

Our invention is especially adapted for use in dispensing coffee, tea, and other beverages of the kind which are produced by preparing a water extract of the water-soluble constituents of a solid beverage material.

According to our invention, a beverage is dispensed by extracting the water-soluble constituents of a discrete mass of beverage material, such as ground coffee or tea leaves, which mass, for convenience called herein a cartridge, is one of a plurality of such masses carried by an elongated carrier, an assembly of such cartridges with their carrier being termed herein a cartridge assembly.

The cartridge assembly of our invention is translated into, through, and from an extraction zone defined by a pair of members relatively movable toward one another to form an extraction zone or chamber embracing a beverage cartridge.

The invention is particularly concerned with means and mechanisms for controlling the sequence of operations so as to insure that the beverage cartridge is in the proper position relative to the members forming the extraction zone when the latter interengage and while the extraction operation takes place.

Among the objects of our invention are to dispense a beverage rapidly in relatively small quantities and at the same time achieving in the beverage the highest standards of flavor, aroma, color and the like, which standards can best be achieved when the beverage is extraced from the flavor-containing materials immediately prior to consumption.

A further object of our invention is to provide a trouble-free, easily-serviced form of dispensing apparatus.

A still further object of our invention is to provide beverage dispensing apparatus in which sanitary conditions can easily be maintained.

Our invention has a still further object, the provision of beverage dispensing apparatus which can be serviced with beverage materials in a convenient and simple manner.

How the foregoing and other objects are attained will be understood more fully from the description which follows and from the drawings, in which FIGURE 1 is a vertical sectional view of a machine constructed in accordance with the invention, certain parts appearing in elevation;

FIGURE 2 is a face view of FIGURE 1 looking toward the right in FIGURE 1;

FIGURE 3 is a fragmentary plan view of FIGURE 2 with the extracting head omitted; and FIGURE 4 is a diagrammatic isometric view of mechanism for stripping a protective film from a cartridge assembly constructed in accordance with the invention.

The dispenser of our invention comprises a frame structure generally indicated at 10, on which are supported an indexing head generally indicated at 11 and an extracting head generally indicated at 12. Heads 11 and 12 cooperate with an expendable cartridge assembly generally indicated at 13 to produce and dispense a beverage.

As may be seen in FIGURE 2, cartridge assembly 13 comprises a series of cartridges 14, containing a beverage material such as ground coffee. Assembly 13 is formed from two continuous strips of a fluid permeable material, such as paper, adhesively secured to one another along their edges and transversely between cartridges 14 in a manner to provide a space within each cartridge 14 for a predetermined amount of a beverage material. Cartridge assemblies according to our invention may be made in any convenient length according to the service for which the assembly is intended; for example if it is desired to provide a coffee dispensing machine capable of dispensing 100 cups of coffee between servicings, then a cartridge assembly 25 ft. in length, on which the cartridges are spaced on 3" centers will provide the necessary capacity.

In FIGURE 2, a cartridge assembly 13 is shown in operating relationship with indexing head 11, which relationship is maintained by the cooperation between pins 15 on indexing head 11 and punched apertures 16 in cartridge assembly 13. In the illustration of FIGURE 2, indexing head 11 is mounted for rotation in a clockwise direction by means of a shaft 17 which is journalled in bearing assembly 18, provided with bearing sleeves 18a and supported by frame structure 10.

Indexing head 11 is adapted to be rotatively driven (in the clockwise direction as viewed in FIGURE 2) by a Geneva movement which comprises a Geneva wheel 19, mounted for rotation with shaft 17. Geneva wheel 19 is driven by pin 20, mounted on crank 21, which crank is mounted for rotation with main drive shaft 22 which is supported by bearing sleeves 23 in bearing assembly 18. Main drive shaft 22 is adapted to be rotated by a reduction gear motor generally indicated at 24. As may be seen from FIGURE 2, when shaft 22 rotates (counterclockwise as shown in FIGURE 2), pin 20 engages successively the six slots 26 of Geneva wheel 19 and thereby produces one-sixth of a revolution of wheel 19 with each revolution of shaft 22. Furthermore, the Geneva movement provides for the drive of shaft 17 in such a manner that the shaft 17 is stationary during 240° of the rotation of shaft 22. Accordingly, during one complete revolution of main drive shaft 22, indexing head 11 occupies one of six possible indexed positions during two-thirds of such revolution of shaft 22; and during the remaining one-third of the revolution of shaft 22, indexing head 11 is stepped from one such possible position to the next succeeding such possible position.

Indexing head 11 is formed with six contiguous plane surfaces around its periphery, each one of which provides a station 25 for the reception of a beverage cartridge. At each station there is provided a cup 27 of generally spherical section (see FIGURE 1), from which communication to the interior of indexing head 11 is provided by means of a duct 28. Each station is also provided with a circular screen 29 which is secured in its position in cup 27 by means of spring clips 30 which extend into duct 28. Spring clips 30 are adapted to secure screen 29 in cup 27 during operation of the dispenser and at the same time permit ready removal of the screen for cleaning.

Each of the six stations of indexing head 11 is successively advanced into the extraction position, i.e., the position in which the cup 27 is at the top of indexing head 11 as illustrated in FIGURES 1 and 2 and in which duct 28 extends downwardly in the vertical direction. Immediately below the position occupied by the duct 28 of a station 25 of indexing head 11 when such station is in extraction position is a funnel-conduit assembly generally indicated at 31, including a funnel portion 32, a duct 33, supported on a standard 34 and a nozzle portion 35 disposed in dispensing relationship to the position of a drinking cup 36 supported on the frame 10.

Extracting head 12, which is disposed generally above indexing head 11, is supported by an arm 37 pivoted to bearing assembly 18 by a pivot pin 38. Extracting head 12 is adapted to be pivoted about pivot pin 38 by means of a link 39 pivotally secured at its upper end to arm 37 by pin 39a and at its lower end to a yoke member 40 by means of a pivot pin 39b. At its lower extremity, yoke 40 carries a cam follower roller 41 mounted for rotation on yoke 40 by means of a pin 42.

Roller 41 engages a cam groove 43 in a cam 44 which is mounted for rotation with main drive shaft 22. The profile of the slot 43 may be seen in FIGURE 2.

When cam 44 rotates through a complete revolution it will be seen that arm 37 and hence extracting head 12 go through a cycle which, beginning with the position illustrated in FIGURE 1 includes a downward movement, a dwell at the lower extremity of such movement (as illustrated in FIGURE 2) a retracting movement to restore pressure head 12 to the position indicated in FIGURE 1, and a dwell in said retracted position. Extracting head 12 includes a fluid dome 45 provided with a gasket 46 which may be an O ring or quad-ring, adapted to engage whichever one of the six plane surfaces of indexing head 11 is presented uppermost, in a continuous line surrounding screen 29. Fluid dome 45 is mounted on a sleeve 47 which telescopically engages a hood 48 which is rigidly secured to arm 37. Telescopic movement of dome 45 and sleeve 47 into hood 48 is resisted by coil spring 49 which reacts between a shoulder 50 on hood 48 and a shoulder 51 on sleeve 47.

Extracting head 12 also includes a valve member generally indicated at 52 having a head 53 adapted to engage valve seat 54 of dome 45. Valve 52, through its stem 55, is secured to hood 48 by a screw 56.

When extracting head 12 is moved downwardly by means of the cam and follower mechanism above described, hood 45 and valve head 53 move as a unit until gasket 46 comes in contact with the surface of indexing head 11. At this point downward motion of dome 45 ceases. Downward motion of hood 48, however, continues, and with it downward motion of valve 52, the spring 49 being accordingly compressed. Such downward movement of valve 52 effectively separates valve head 53 and seat 54, permitting extracting fluid (which is supplied to the interior of pressure head 12 by a conduit 56) to pass into and through pressure dome 45. The required pressure on the extracting fluid may be developed by a pump, generally indicated at 57.

The dispensing apparatus of the invention is readied for service by threading the end of a cartridge assembly 13 over the top of indexing head 11 so that the first cartridge 14 is in juxtaposition to screen 29 of the station of the indexing head which is in uppermost position, in such a manner that the apertures 16 of cartridge assembly 13 are penetrated by pins 15 of indexing head 11.

The dispensing apparatus of our invention is specifically adaptable to automatic operation, i.e., operation with a system of electrical control providing for the dispensing of a cup of beverage responsive to the actuation of a single control member. For this purpose motor 24 may be provided with a conventional circuit arranged so that when the main control switch or push-button, or coin-operated switch, is actuated, motor 24 operates for a period of time such as to provide for one complete revolution of main drive shaft 22, after which motor 24 is de-energized.

Such a circuit, as illustrated in FIGURE 1, may include a segmental switch 58 and an actuating push-button 59. Segmental switch 58, which may be mounted within the housing of motor 24, is arranged so that the segmental contact 58a is fixed against rotation and the moving contact 58b rotates in synchronism with main drive shaft 22. The switch 58 is arranged so that when the dispensing apparatus is in the at-rest position illustrated in FIGURE 1, moving contact 58b is between the ends of segmental contact 58a. If, now, push-button 59 be momentarily actuated, the circuit to motor 24 will be completed and the motor will begin to rotate. The motor will then continue to receive energization through segmental switch 58, even though push-button 59 has been released. When moving contact 58b completes a full revolution and again occupies the position illustrated in FIGURE 1, the circuit to motor 24 is interrupted and the apparatus is again at the position illustrated in FIGURE 1. At this point a spent cartridge 14 is at the uppermost station of indexing head 11. In this condition pin 20 is about to enter the slot 26 of Geneva wheel 19 which is at the position indicated by 26a in FIGURE 2. In a typical case the control system is aranged to provide for one complete rotation of main drive shaft 22 in eight seconds. This means that the dispenser of the invention can dispense cups of beverage at intervals of eight seconds.

With the apparatus in this condition, when the circuit for motor 24 is energized and shaft 22 begins to rotate in the counter-clockwise direction, pin 20 enters slot 26, and during the next 120° of rotation of shaft 22, causes indexing head 11 to rotate in a clockwise direction by 60°, bringing the next station to the extracting position and thereby supplying a fresh cartridge 14 for the extraction operation. During the first 90° of rotation of main drive shaft 22 from the starting position just described, cam follower 41 rides the high portion of groove 43. Beginning at about 90° after rotation has started cam follower 41 begins to follow slot 43 toward the lower position and consequently extracting head 12 begins to move toward indexing head 11.

When main drive shaft 22 has rotated through 120° from the starting position and when pin 20 has thus just cleared the position of the Geneva slot 26 which is now in the position at 26b in FIGURE 2, cam follower 41 is well toward the low point of its travel, and extracting head 12 is well toward engagement with indexing head 11. As main drive shaft 22 continues to rotate, extracting head 12 continues to move downwardly, and gasket 46 of fluid dome 45 now engages the surface of indexing head 11 around the uppermost extraction station. With this engagement, downward movement of fluid dome 45 ceases; further downward movement of hood 48 and valve 54 continues, so that valve head 53 becomes separated from seat 54, permitting extracting fluid to flow downwardly under pressure through the upper permeable layer 60 of cartridge 14, through the beverage material 61 contained in the cartridge, through lower permeable layer 62, and through screen 29, from which the fluid extracted from the beverage material 62 runs down the inner surface of cup 27, through duct 28, into funnel 32 and through conduit 33 and nozzle 35 to the cup 36.

Meanwhile, main drive shaft 22 has continued to rotate, and by the time the desired quantity of fluid has passed through the extraction zone, cam 44 has rotated to a position where it begins to lift cam follower 41. At first, this lifting of cam follower 41 has no effect on fluid dome 45, but since extraction head 12 is rising, valve head 53 also rises until it engages seat 54 shutting off the flow of fluid. Thereafter, as the upward movement of extracting head 12 continues, fluid dome 45 is lifted clear of indexing head 11, and by the time the control circuit de-energizes motor 24, dome 45 will have resumed the position illustrated in FIGURE 1.

Our invention is useful in the dispensing of beverages under conditions such that relatively long periods of time—of the order of days—may elapse between servicings of the machine. It may thus become desirable to provide a greater degree of protection for material in the cartridges than can be provided by the permeable layers thereof.

Under these circumstances, there may be provided an impermeable sheath for the cartridge assembly, such a sheath being illustrated in FIGURE 4. The sheath may comprise two strips 63 of impermeable material, such as aluminum foil or polyethylene film, adhesively secured to one another at their edges as at 64. The ends of the strips may also be secured to one another; we have illustrated such end treatment at 65 in FIGURE 4. It will be understood that both ends of the sheath are so treated at the time of manufacture; and that the space within the sheath may be evacuated or charged with an inert gas to protect the contents until the cartridge is threaded into the dispensing apparatus.

A modification of the dispensing apparatus of our invention which utilizes such sheathed cartridge assemblies is also illustrated in FIGURE 4. Such modification includes, on each side of the supply run of the cartridge assembly, i.e., the run on the way to the extraction position, a pair of rollers, each of which pair is adapted to grippingly engage one of the impermeable strips 63 and strip it from the other and from cartridge assembly 13. The outer rollers 66 of each pair are driven in synchronism with indexing head 11, so as to take up, during each advancing step of indexing head 11, a length of sheathing material equal to the distance between centers of adjacent cartridges 14 of cartridge assembly 13. The inner rollers 67 of each pair are idlers which may be resiliently urged against the drive rollers 66 by any convenient means.

When a dispenser embodying the modifications of FIGURE 4 is put in service, the sealed leading end of the cartridge is opened by separating the two shield strips 63 and threading them into the nips between the two pairs of rollers. At the same time the cartridge proper is threaded onto indexing head 11 as described above. Operation of the modified apparatus proceeds as above described with the addition that, with each actuation of the mechanism, the roller pairs 66-67 withdraw from the cartridge assembly a length of the protective covering strips 63.

We claim:

1. In a beverage dispenser, an indexing head having a beverage-cartridge station arranged to pass successively to and from an extraction position, an extracting head having a fluid dome arranged for movement into and from engagement with said indexing head in a continuous line surrounding said station, one of said heads being provided with gasket means extending along said line to provide for temporarily sealing said heads together to form an extraction zone opposite sides of which are formed by said station and said dome and the edges of which are formed by said gasket means, a plurality of beverage cartridges serially arranged at regular intervals along an elongated carrier, said carrier being translatable along a path passing through said extraction zone, means for coordinating such translation of said carrier with movement of said indexing head to insure juxtaposition of a cartridge with said station each time said station moves into said extraction zone, a valve for admitting fluid to said dome, actuating means for said heads and said valve, means for conducting beverage from said extraction zone, and timing means for effecting movement of said station and a cartridge into said extraction zone, for providing a dwell of said cartridge in said zone, during said dwell moving said extracting head into engagement with said indexing head, providing a dwell for said engagement, opening said valve to permit fluid to pass through said cartridge, closing said valve, moving said extraction head out of said engagement, moving said indexing head to remove said station and the spent cartridge from said zone, removing said spent cartridge from juxtaposition with said station and positioning a fresh cartridge in juxtaposition to said station so that said operations may be repeated.

2. In a beverage dispenser, a pair of members arranged for relative movement toward and away from a position of engagement with one another in which they cooperate to define a beverage extraction chamber, one of said members having an inlet port for the introduction of an extracting fluid thereinto and the other having an outlet port for the discharge of extract therefrom, elongated flat carrier means carrying a plurality of discrete masses of beverage material spaced out along the lengthwise dimension thereof at regular intervals, means for advancing said carrier through the position of said chamber when said members are disengaged, means for effecting engagement of said members, said means for advancing said carrier comprising indexing pins on one of said members movable in the direction of tape advancement and apertures in said carrier cooperating with each other to insure that one of said masses is in said position when said members are engaged and means for admitting extracting fluid through said inlet port while said members are engaged.

3. A beverage dispenser in accordance with claim 2 and further including a layer of liquid and gas-impermeable material adjacent the outer surfaces of said carrier means opposite said masses of material, and means for rendering said impermeable material ineffective to prevent fluid extraction of the beverage material in said masses.

4. In a beverage dispenser, a pair of members arranged for relative movement toward and away from a position of engagement with one another in which they cooperate to define a beverage extraction chamber, one of said members having an inlet port for the introduction of an extracting fluid thereinto and the other having an outlet port for the discharge of extract therefrom, elongated flat carrier means carrying a plurality of discrete masses of beverage material spaced out along the lengthwise dimension thereof through the position of said chamber when said members are disengaged, the beverage carrier having marginal portions along each edge thereof projecting beyond the beverage masses and said relatively movable members having sealing surfaces adapted to interengage with the tape therebetween in a region completely surrounding each beverage mass, means for advancing said carrier through the position of said chamber when said members are disengaged, said means including a series of indexing pins mounted to travel in a circular path, and apertures in said carrier cooperating with said pins to insure that one of said masses is in said position when said members are engaged, the apertures in the carrier being spaced from each other lengthwise of the carrier by distances equal to the spacing from center to center of the beverage masses but the apertures being located in planes intermediate adjacent beverage masses, and the indexing pins also being spaced from each other by distances equal to the spacing from center to center of the beverage masses, and means for admitting extracting fluid through said inlet port while said members are engaged.

5. Apparatus for use with a beverage tape for sequentially brewing a portion of beverage from each of a series of liquid permeable pods of beverage material carried in spaced relation along said tape having marginal portions along each edge projecting beyond the beverage pods and having indexing holes therein in planes between the pods along the tape, comprising extraction mechanism for forming extract from successive pods of beverage material including relatively separable and engageable members adapted when separated to receive therebetween a pod on such a tape and adapted when engaged to grip the tape in a region extending completely around the pod and thereby form a pod enclosing extraction chamber, mechanism for forcing liquid through the chamber and a pod enclosed therein, mechanism for indexing the position of each successive pod of such a tape with relation to said relatively separable and engageable members including a series of indexing pins adapted to engage with successive indexing holes of such a tape, with the pins spaced from each other by distances equal to the center to center spacing of the pods and the pins being movable to advance such a tape and thereby sequentially bring pods between said separable and engageable members, actuating means for effecting separation and engagement of said members, actuating means for operating the tape indexing pins to effect advancement of such a tape, and means interconnecting said two actuating means to provide operation thereof in a predetermined relation.

6. Apparatus for use with a beverage tape for sequentially brewing a portion of beverage from each of a series of liquid permeable pods of beverage material carried in spaced relation along said tape having indexing holes therein in predetermined relation to the pods along the tape, comprising extraction mechanism for forming extract from successive pods of beverage material including relatively separable and engageable members adapted when separated to receive therebetween a pod on such a tape and adapted when engaged to form a pod enclosing extraction chamber, mechanism for forcing liquid through the chamber and a pod enclosed therein, and mechanism for indexing the position of each succesive pod of such a tape with relation to said relatively separable and engageable members including an indexing pin means adapted to engage with successive indexing holes of such a tape, said pin means being mounted on one of said members adjacent said extraction chamber and displaceable in the direction of tape advancement, said indexing mechanism advancing such a tape in a predetermined relation to the engagement and separation of said members and providing for sequentially bringing pods between said separable and engageable members.

7. Beverage dispensing apparatus comprising a disposable elongated flat carrier tape having a series of liquid permeable pods of beverage material arranged in spaced relation along the tape, having marginal portions along each edge thereof projecting beyond the beverage pods and having indexing holes arranged along the tape in predetermined relation to the pods, tape handling members for effecting indexing of the tape pods and extracting of the beverage therefrom including tape engaging members which are relatively movable toward and away from each other to grip the tape and hold a pod in an extraction position and to release the tape and provide for removal of a spent pod from the extraction position, said relatively movable members having sealing surfaces adapted to interengage with the tape therebetween in a region completely surrounding each beverage pod, means for forcing liquid through a pod held by said members in said extraction position, one of said tape handling members being rotatable and having an indexing pin adapted to engage an indexing hole in the carrier tape to effect advancement of the tape with respect to said extraction position, and mechanism interrelating the tape gripping motion of said members with the rotative motion of said rotatable member and providing for indexed stepwise motion of the tape to successively bring the pods thereof into and out of said extraction position.

8. A construction according to claim 7 in which one of the tape gripping members is mounted for rotation with respect to the other and carries said indexing pins.

9. Beverage dispensing apparatus comprising a strip type carrier tape having a series of liquid permeable pods of beverage material arranged in spaced relation along the tape, tape handling members for effecting indexing of the tape pods and extracting of the beverage therefrom including tape engaging members which are relatively movable toward and away from each other to grip the tape and hold a pod in an extraction position and to release the tape and provide for removal of a pod from the extraction position, and means for forcing liquid through a pod held by said members in said extraction position, the carrier tape having marginal portions along each edge of the tape projecting beyond the beverage pods, and said relatively movable members having sealing surfaces adapted to interengage with the tape therebetween in a region completely surounding each pod.

10. A strip type beverage carrier tape having a series of liquid permeable pods of beverage material arranged in spaced relation along the tape and adapted to be sequentially subjected to a brewing operation in a brewing chamber of a brewing machine, the carrier tape comprising fluid permeable paper strips having flat areas between the pods and having flat marginal areas along each edge projecting well beyond the beverage pods, said areas cooperating to provide flat sealing regions adapted to be engaged in the brewing machine at all sides of the brewing chamber, the paper strips being adhesively secured to each other around the entire periphery of each pod, and the tape having indexing means adapted to cooperate with indexing mechanism for indexing the position of a pod with respect to the brewing chamber of a brewing machine when the tape is fed through the machine, said indexing means comprising apertures formed in the tape in planes intermediate adjacent pods lengthwise of the tape and positioned inboard of the edges of the tape so as to leave at least most of said marginal portions projecting beyond the apertures, and the areas of the tape completely surrounding the pods including the areas between the pods and between the pods and the edges of the tape in the region of said marginal areas being imperforate to provide imperforate zones completely surrounding the pods adapted to be engaged and sealed around the brewing chamber of a brewing machine.

References Cited by the Examiner

UNITED STATES PATENTS

| | | | |
|---|---|---|---|
| 877,631 | 1/08 | Clark | 210—391 |
| 1,083,900 | 1/14 | Brown | 99—295 |
| 1,412,388 | 4/22 | Clermont | 99—295 |
| 1,467,778 | 9/23 | Paola | 99—286 |
| 1,813,872 | 7/31 | Bausman | 99—283 |
| 1,837,368 | 12/31 | Medin | 99—283 |
| 1,966,626 | 7/34 | Henry | 210—95 |
| 1,979,700 | 11/34 | May | 88—18.3 X |
| 2,335,159 | 11/43 | Salfisberg | 99—77.1 X |
| 2,377,118 | 5/45 | Weisman | 99—77.1 |
| 2,451,195 | 10/48 | Brown | 99—295 |
| 2,529,395 | 11/34 | Hummel | 99—302 |
| 2,939,380 | 6/60 | Parraga. | |
| 3,048,070 | 8/62 | Groves. | |

FOREIGN PATENTS 258,139   4/27   Italy.

WALTER A. SCHEEL, *Primary Examiner.*

JOSEPH D. BEIN, ROBERT E. PULFREY, *Examiners.*